US011536700B2

United States Patent
Zhao et al.

(10) Patent No.: US 11,536,700 B2
(45) Date of Patent: Dec. 27, 2022

(54) CONTROL METHOD OF PROBE WITH ULTRASONIC PHASED ARRAY TRANSDUCERS IN HINGE ARRAY

(71) Applicant: HARBIN INSTITUTE OF TECHNOLOGY, Harbin (CN)

(72) Inventors: Bo Zhao, Harbin (CN); Jiaxin Li, Harbin (CN); Weijia Shi, Harbin (CN); Jiubin Tan, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 269 days.

(21) Appl. No.: 17/079,430

(22) Filed: Oct. 24, 2020

(65) Prior Publication Data
US 2021/0041404 A1 Feb. 11, 2021

(30) Foreign Application Priority Data
Apr. 24, 2020 (CN) .......................... 202010329018.1

(51) Int. Cl.
*G01N 29/26* (2006.01)
*G01N 29/22* (2006.01)
(Continued)

(52) U.S. Cl.
CPC .......... *G01N 29/262* (2013.01); *G01N 29/04* (2013.01); *G01N 29/221* (2013.01);
(Continued)

(58) Field of Classification Search
CPC .. G01N 29/262; G01N 29/225; G01N 29/221; G01N 29/223; G01N 29/04
See application file for complete search history.

(56) References Cited

U.S. PATENT DOCUMENTS

2009/0277273 A1*  11/2009  Hong ................. G01N 29/032
                                                73/632
2021/0041403 A1*  2/2021  Shi ....................... B06B 1/0607

\* cited by examiner

*Primary Examiner* — Helen C Kwok
(74) *Attorney, Agent, or Firm* — IPRO, PLLC

(57) ABSTRACT

The disclosure relates to a control method of a probe with ultrasonic phased array transducers in a hinge array, and belongs to the technical field of ultrasonic detecting. The control method includes the steps: firstly, fixing a part under test, making a central piezoelectric array element of piezoelectric array elements for the ultrasonic phased array transducers in the hinge array make contact with a surface of the part under test, and then fixing a fixed support; before detection is started, driving the hinge array through voice coil motors to make the piezoelectric array elements completely fit the surface of the part under test, wherein the number of the piezoelectric array elements is 2N+1 (N=1, 2, 3, 4 and 5), and different values of N are selected according to a size of the part under test; with the value of pressure of the central piezoelectric array element as a standard and difference values between values of pressures of other piezoelectric array elements and the value of pressure of the central piezoelectric array element as control signals of respective corresponding voice coil motor coils, controlling output rods to drive the hinge array; keeping the values of pressures of all the piezoelectric array elements consistent by means of an incremental digital PID control method; and then realizing deflecting and focusing of ultrasonic waves by means of a time delay rule for ultrasonic detecting, thereby detecting parts under test with planar or curved surfaces.

1 Claim, 2 Drawing Sheets

(51) Int. Cl.
*G01N 29/24* (2006.01)
*G01N 29/04* (2006.01)
(52) U.S. Cl.
CPC ......... *G01N 29/223* (2013.01); *G01N 29/225* (2013.01); *G01N 29/2437* (2013.01); *G01N 2291/106* (2013.01)

CONTROL METHOD OF PROBE WITH ULTRASONIC PHASED ARRAY TRANSDUCERS IN HINGE ARRAY

TECHNICAL FIELD

The disclosure belongs to the technical field of ultrasonic detecting, and mainly relates to a control method of a probe with ultrasonic phased array transducers in a hinge array.

BACKGROUND

In recent years, with the rapid development of industrial level, requirements of aerospace equipment and weapons for key structures and performance are increasingly high. The processing process and working environment quite easily cause holes, cracks, inclusions and other defects in product structures, and if the defects were not timely and accurately detected, a variety of sudden accidents would be likely to happen. Ultrasonic detecting technology has the advantages of good directivity, high penetration, high sensitivity, high efficiency, high energy, wide detecting range, large detecting depth, accurate positioning, high visibility, easy automation, low cost, simple operation, safety and convenient application, thereby being widely used in the detecting field.

Ultrasonic detecting technology refers to the detecting technology that studies waveforms of reflection, transmission and scattering of ultrasonic waves after the ultrasonic waves and a specimen interact with each other, so as to complete detecting macroscopic defects, detecting geometric properties, and detecting and characterizing mechanical property changes and texture structures of the specimen, and to evaluate specific application performance of the specimen.

In recent years, ultrasonic phased array detecting technology has developed rapidly in the industrial detecting field. Ultrasonic phased array detecting technology has attracted more and more attention and become a research hotspot. More and more researchers have conducted in-depth research on the ultrasonic phased array detecting technology. An electromagnetic ultrasonic transducer and a control method thereof (an improved electromagnetic ultrasonic transducer under resonance control and a control method thereof; Publication Number: CN109856251A) were put forward by Chongqing University. An improved electromagnetic ultrasonic transducer under resonance control and a control method thereof were disclosed. The electromagnetic ultrasonic transducer includes a high-frequency power oscillation signal output circuit, a coil with a bias magnetic field, echo signal detection circuits and a main controller. The high-frequency power oscillation signal output circuit includes a high-frequency inverter driving circuit, an impedance matching network and a static matching capacitor. The echo signal detection circuits include a high-voltage isolation circuit and an echo signal filtering circuit. The main controller is configured to collect filtered ultrasonic echo signals and adjust a high-frequency inverter driving frequency according to envelope amplitude feedback of the ultrasonic echo signals. The control method of the improved electromagnetic ultrasonic transducer under resonance control may provide a power pulse voltage required by the electromagnetic ultrasonic transducer, the static matching capacitor and the coil work at a quasi resonant state, thereby initiating a maximum-power ultrasonic signal in an object under test, and due to a low harmonic content, the improved electromagnetic ultrasonic transducer under resonance control has a high detecting accuracy. However, this method has the problems that the electromagnetic conversion efficiency is low, the sensitivity depends on a gap between a probe and a flaw detection object, and a special fixture is needed in detection.

A cable damage detection device based on ultrasonic transducers and a use method (a cable damage detection device based on ultrasonic transducers and a use method; Publication Number: CN108775880) were put forward by Nanjing University of Posts and Telecommunications. The cable damage detection device based on the ultrasonic transducers and the use method were disclosed. The cable damage detection device based on the ultrasonic transducers includes a first shell and a second shell, the second shell is sleeved over a rotating shaft of the first shell to jointly form a cylindrical device, a cable groove for storing and fixing a cable is formed in the inner wall of the second shell, the end faces of the two sides of the first shell and the end faces of the two sides of the second shell are each provided with a plurality of slide grooves, sliders are disposed on the slide grooves, and the transducers for detecting the cable are disposed on the sliders. The disclosure may make the transducers rapidly clamp the cable under test, thereby realizing convenient and rapid long-distance damage detection of the cable, and meanwhile the method of the disclosure is self-adaptive to various cables with different radiuses, and may make a fine adjustment according to a curvature and bending degree of a cable, thereby making the transducers be able to be in rapid contact and coupling with the cable, quite conveniently adjusting positions of the transducers on the surface of the cable, and then providing a good signal sending and receiving environment for ultrasonic guided wave damage detection of the cable. However, this method has the problems that values of pressures borne by all piezoelectric array elements of each transducer may not be surely kept consistent before detection, which results in detection errors and a limited application range.

At present, detecting methods based on ultrasonic phased array transducers in the market are roughly divided into two categories. One is ultrasonic detecting methods based on planar ultrasonic phased array transducers. However, such methods are not able to be applied to detecting parts under test with curved surfaces. The other is ultrasonic detecting methods based on roller ultrasonic phased array transducers. Although such methods are able to be applied to detecting both parts under test with planer surfaces and parts under test with curved surfaces, it is difficult to ensure that values of pressures borne by all piezoelectric array elements of each ultrasonic phased array transducer are the same in a detection moving process, resulting in detection errors and affecting detection results. To sum up, at present, an ultrasonic phased array transducer for detecting both parts under test with planar surfaces and parts under test with curved surfaces, and a control method thereof are lacked in the market.

SUMMARY

In view of the above defects in the prior art, a control method of a probe with ultrasonic phased array transducers in a hinge array is put forward to detect both parts under test with planar surfaces and parts under test with curved surfaces. When piezoelectric array elements of the ultrasonic phased array transducers are driven and placed to completely fit a surface of a part under test, all the piezoelectric array elements serve as pressure sensors by means of a piezoelectric effect, pressure signals of all the piezoelectric array elements are collected to control voice coil motors for driving and placing all the piezoelectric array elements, control output rods to drive the hinge array, and finally keep values of pressures of all the piezoelectric array elements consistent, thereby reducing detection errors.

The disclosure is implemented as follows:

The control method of the probe with the ultrasonic phased array transducers in the hinge array includes the following steps: firstly, fixing the part under test, making the central piezoelectric array element of the piezoelectric array elements of the ultrasonic phased array transducers in the hinge array make contact with the surface of the part under test, and then fixing a fixed support; symmetrically arraying and fixedly connecting voice coil motor magnetic cylinders onto the fixed support; before detection is started, driving the hinge array through the voice coil motors to make all the piezoelectric array elements completely fit the surface of the part under test, wherein the number of the piezoelectric array elements is 2N+1 (N=1, 2, 3, 4 and 5), and different values of N are selected according to a size of the part under test; configuring all the piezoelectric array elements as the pressure sensors by means of the piezoelectric effect to collect the values of pressures of all the piezoelectric array elements; with the value of pressure of the central piezoelectric array element as a standard and difference values between values of pressures of other piezoelectric array elements and the value of pressure of the central piezoelectric array element as control signals of respective corresponding voice coil motor coils, controlling the output rods to drive the hinge array; making the difference values of the values of pressures of all the piezoelectric array elements and the value of pressure of the central piezoelectric array element less than an error allowable value $10^{-3}$N by means of an incremental digital PID control method, that is, considering that the values of pressures of all the array elements are kept consistent finally within an error allowable range; and then realizing deflecting and focusing of ultrasonic waves by means of a time delay rule for ultrasonic detecting, thereby detecting different parts under test with planar or curved surfaces.

Compared with related art, the disclosure has the following advantages:

The piezoelectric array elements serve as the pressure sensors by means of the piezoelectric effect and are configured to collect the pressure signals as the control signals for driving and placing the ultrasonic phased array elements, and keep the values of pressures of all the array elements consistent, thereby reducing detection errors; and then, by referring to the time delay rule, deflecting and focusing of the ultrasonic waves are realized for ultrasonic detecting, thereby detecting different parts under test with planar surfaces or curved surfaces.

Figure 1:
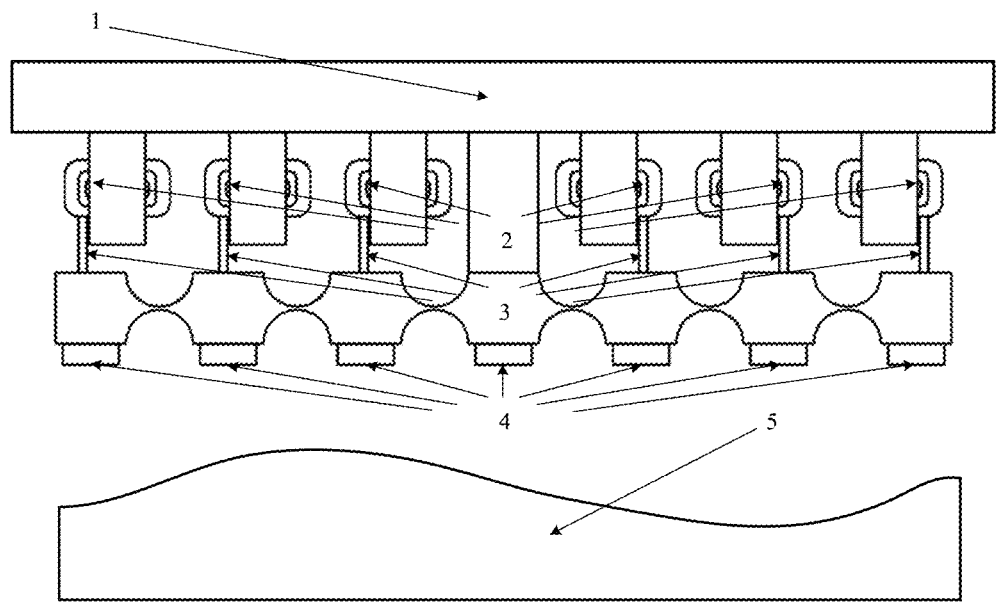
FIG. 1 is a schematic diagram of a detecting device with ultrasonic phased array transducers in a hinge array.
Figure 2:
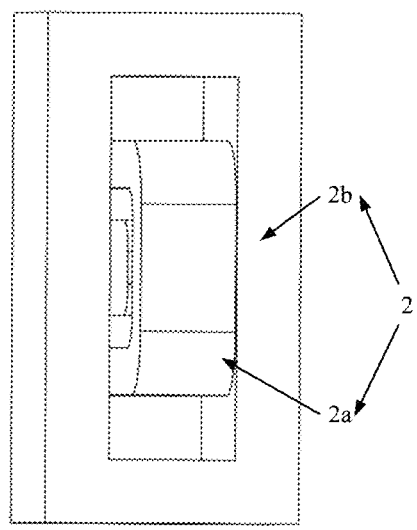
FIG. 2 is a schematic structural diagram of a voice coil motor.
Figure 3:
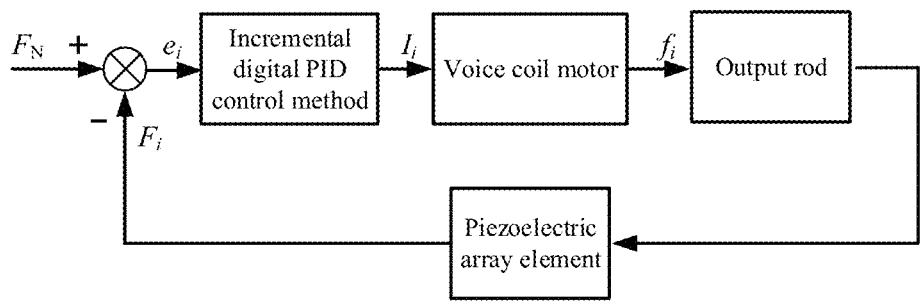
FIG. 3 is a block diagram of control over piezoelectric array elements of ultrasonic phased array transducers in a hinge array.

Reference numerals for parts in Figures: 1—fixed support, 2—voice coil motor, 2a—voice coil motor coil, 2b—voice coil motor magnetic cylinder, 3—output rod, 4—piezoelectric array element, and 5—part under test.

DETAILED DESCRIPTION

The disclosure will be further described in detail below with reference to the accompanying drawings:

A control method of a probe with ultrasonic phased array transducers in a hinge array includes the following steps: firstly, fixing a part under test 5, making a central piezoelectric array element of piezoelectric array elements 4 make contact with a surface of the part under test 5, and then fixing a fixed support 1; symmetrically arraying and fixedly connecting voice coil motor magnetic cylinders 2b onto the fixed support 1; before detection is started, driving the hinge array through voice coil motors 2 to make the piezoelectric array elements 4 completely fit the surface of the part under test 5, wherein the number of the piezoelectric array elements is 2N+1 (N=1, 2, 3, 4 and 5), and different values of N are selected according to a size of the part under test; configuring the piezoelectric array elements 4 as pressure sensors by means of a piezoelectric effect to collect all values of pressures, $F_1, F_2, \ldots, F_N, \ldots, F_{2N}$ and $F_{2N+1}$; with the value of pressure $F_N$ of the central piezoelectric array element of the piezoelectric array elements 4 as a standard and difference values $e_1, e_2, \ldots, e_{N-1}, e_{N+1}, \ldots, e_{2N}$ and $e_{2N+1}$ between values of pressures of other piezoelectric array elements and the value of pressure $F_N$ of the central piezoelectric array element as control signals of respective corresponding voice coil motor coils 2a, controlling output rods 3 to drive the hinge array; controlling the values of pressures of all the piezoelectric array elements by means of an incremental digital PID control method:

$$y_i(t) = K_p \left\{ e_i(t) + \frac{T}{T_i} \sum_{j=0}^{t} e_i(j) + \frac{T_d}{T} [e_i(t) - e_i(t-1)] \right\}$$

$$y_i(t-1) = K_p \left\{ e_i(t-1) + \frac{T}{T_i} \sum_{j=0}^{t-1} e_i(j) + \frac{T_d}{T} [e_i(t-1) - e_i(t-2)] \right\}$$

wherein $K_p$ is a proportionality coefficient, $T_i$ is an integral time constant, $T_d$ is a differential time constant, T is a sampling cycle, t is a current time, y(t) is an output of a controller, $e_i(t)$ is an input of a sampling controller at a time t, $e_i(t-1)$ is a sampling input at a time t−1, $e_i(t-2)$ is a sampling input of a time t−2, and i=1, 2, . . . , N−1, N+1, . . . , 2N and 2N+1; obtaining an incremental digital PID difference equation: h(t)=Δy(t)=y(t)−y(t−1)=$K_p$[e(t)−e(t−1)]+$K_I$e(t)+$K_D$[e(t)−2e(t−1)+e(t−2)], wherein $K_I$ is an integral coefficient, $K_D$ is a differential coefficient, Δy(t) is a difference of the output of the controller, and h(t) is an incremental digital PID difference function; making the difference values of the values of pressures of all the piezoelectric array elements and the value of pressure of the central piezoelectric array element less than an error allowable value $10^{-3}$N by means of the incremental digital PID control method, that is, considering that the values of pressures of all the piezoelectric array elements are kept consistent finally within an error allowable range, that is, $F_1=F_2=\ldots=F_N=\ldots=F_{2N}=F_{2N+1}$; and then realizing deflecting and focusing of ultrasonic waves by means of a time delay rule for ultrasonic detecting, thereby detecting parts under test with planar or curved surfaces.

What is claimed is:

1. A control method of a probe, wherein the probe comprises ultrasonic phased array transducers in a hinge array, and the control method comprises the following steps:
fixing a part under test, making a central piezoelectric array element of piezoelectric array elements contact with a surface of the part under test, and then fixing a fixed support;

symmetrically arraying and fixedly connecting voice coil motor magnetic cylinders onto the fixed support;

before detection is started, driving the hinge array through voice coil motors to make the piezoelectric array elements completely fit the surface of the part under test, wherein a number of the piezoelectric array elements is 2N+1, where N=1, 2, 3, 4 and 5, and different values of N are selected according to a size of the part under test;

configuring the piezoelectric array elements as pressure sensors using a piezoelectric effect to collect all values of pressures, $F_1, F_2, \ldots, F_N, \ldots, F_{2N}$ and $F_{2N+1}$;

by using difference values e, as control signals of respective corresponding voice coil motor coils, i=1, 2, ..., (N−1), (N+1), ..., 2N, (2N+1), $e_i=(F_i-F_N)$, $F_N$ being the value of pressure of the central piezoelectric array element, controlling output rods to drive the hinge array;

controlling the values of pressures of all the piezoelectric array elements i, i=1, 2, ..., (N−1), (N+1), ..., 2N and (2N+1), by an incremental digital PID control method:

$$y_i(t) = K_p \left\{ e_i(t) + \frac{T}{T_i} \sum_{j=0}^{t} e_i(j) + \frac{T_d}{T} [e_i(t) - e_i(t-1)] \right\}$$

$$y_i(t-1) = K_p \left\{ e_i(t-1) + \frac{T}{T_i} \sum_{j=0}^{t-1} e_i(j) + \frac{T_d}{T} [e_i(t-1) - e_i(t-2)] \right\}$$

wherein $K_p$ is a proportionality coefficient, $T_i$ is an integral time constant, $T_d$ is a differential time constant, T is a sampling cycle, t is a current time, y(t) is an output of a controller, $e_i(t)$ is an input of a sampling controller at a time t, $e_i(t-1)$ is a sampling input at a time t−1, $e_i(t-2)$ is a sampling input of a time t−2;

obtaining an incremental digital PID difference equation: $h(t)=\Delta y(t)=y(t)-y(t-1)=K_p[e(t)-e(t-1)]+K_I e(t)+K_D[e(t)-2e(t-1)+e(t-2)]$, wherein $K_I$ is an integral coefficient, $K_D$ is a differential coefficient, $\Delta y(t)$ is a difference of the output of the controller, and h(t) is an incremental digital PID difference function;

making the difference values of the values of pressures of all the piezoelectric array elements and the value of pressure of the central piezoelectric array element less than an error allowable value $10^{-3}$ Newton by the incremental digital PID control method, that is, considering that the values of pressures of all the piezoelectric array elements are kept consistent finally within an error allowable range, namely, $F_1=F_2= \ldots = F_N= \ldots =F_{2N}=F_{2N+1}$; and then realizing deflecting and focusing of ultrasonic waves by a time delay rule for ultrasonic detecting, thereby detecting the part under test with a planar or curved surface.

* * * * *